Figure 1:
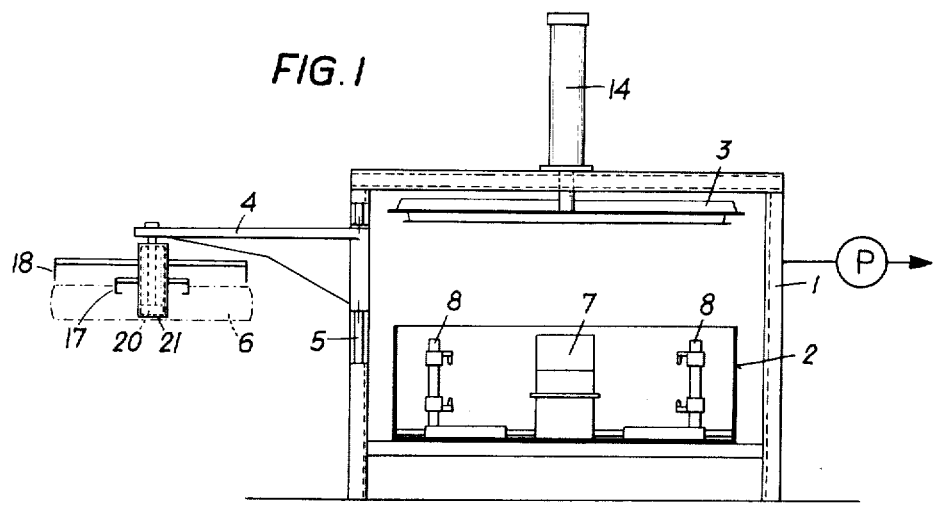

United States Patent [19]

Edler

[11] B 3,925,128

[45] Dec. 9, 1975

[54] PROCESS FOR RETREADING A VEHICLE TYRE

[76] Inventor: Bruno Edler, Roseggerstrasse 25, A-8600 Bruck a.d. Mur, Austria

[22] Filed: Feb. 5, 1973

[21] Appl. No.: 329,612

[44] Published under the Trial Voluntary Protest Program on January 28, 1975 as document no. B 329,612.

Related U.S. Application Data

[62] Division of Ser. No. 52,861, July 7, 1970, Pat. No. 3,738,893.

[30] Foreign Application Priority Data

July 17, 1969   Austria .............................. 6875/69

[52] U.S. Cl. ............... 156/96; 156/128; 156/394; 264/36; 425/17
[51] Int. Cl.² .. B29H 5/04; B29H 5/16; B29H 17/36
[58] Field of Search...... 156/96, 110, 123, 126–130, 156/381, 382, 394, 394 FM, 87; 264/36, 315, 316, 326; 425/11, 17–28, 43, 47, 49, 382, 390, 812

[56] References Cited

UNITED STATES PATENTS

| | | | |
|---|---|---|---|
| 1,455,260 | 5/1923 | Midgley | 156/394 |
| 2,966,936 | 1/1961 | Schelkmann | 156/96 |
| 3,236,709 | 2/1966 | Carver | 156/96 |
| 3,283,795 | 11/1966 | Schelkmann | 156/96 |
| 3,332,820 | 7/1967 | Porter | 156/394 |

FOREIGN PATENTS OR APPLICATIONS

| | | | |
|---|---|---|---|
| 92,699 | 6/1959 | Netherlands | 156/394 FM |
| 1,068,458 | 11/1959 | Germany | 18/6 T |

Primary Examiner—Douglas J. Drummond
Assistant Examiner—John E. Kittle
Attorney, Agent, or Firm—Woodhams, Blanchard and Flynn

[57] ABSTRACT

A method for retreading a vehicle tyre whereby a closed tread band is disposed around and spaced from a tyre and there the space between the tread band and the tyre is evacuated. The tread band is there brought into contact with the tyre and affixed thereto.

14 Claims, 12 Drawing Figures

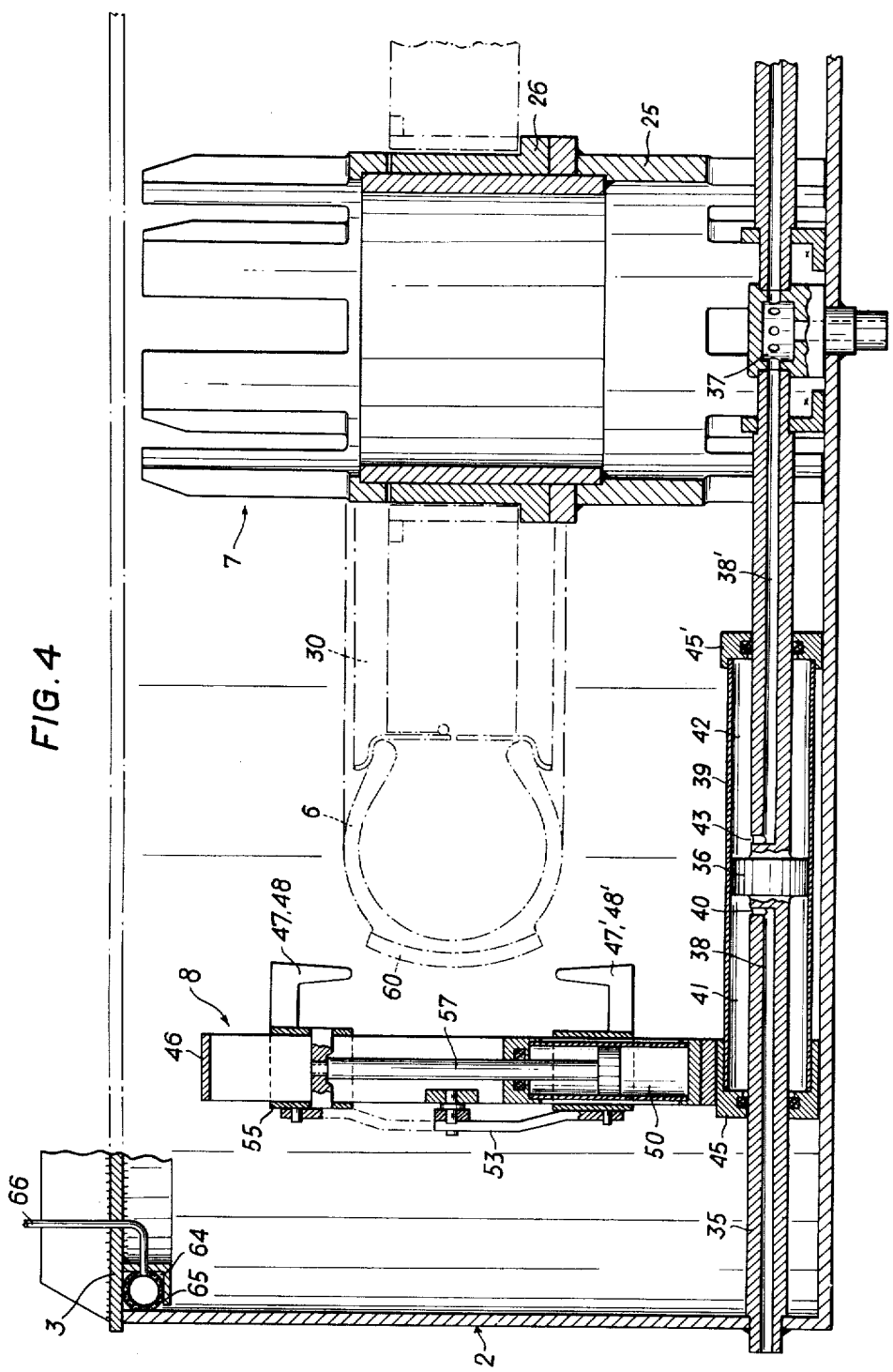

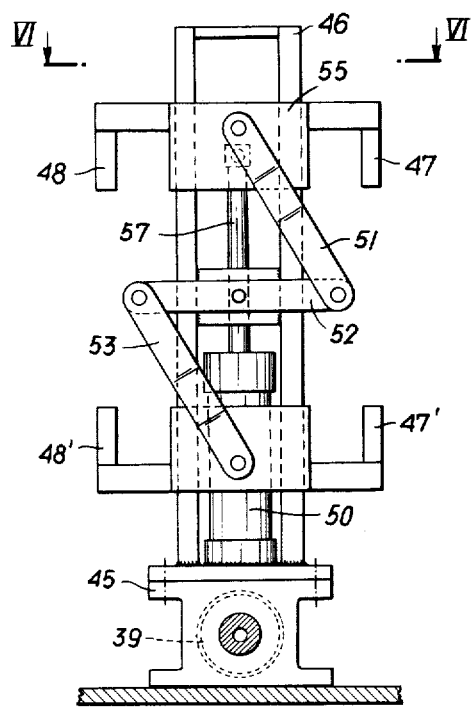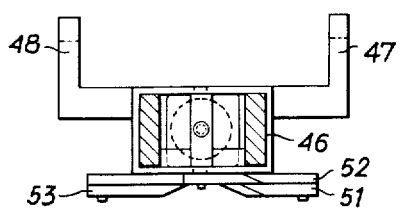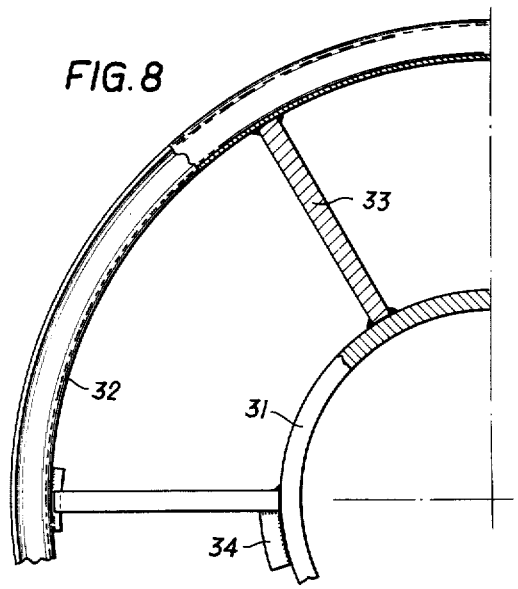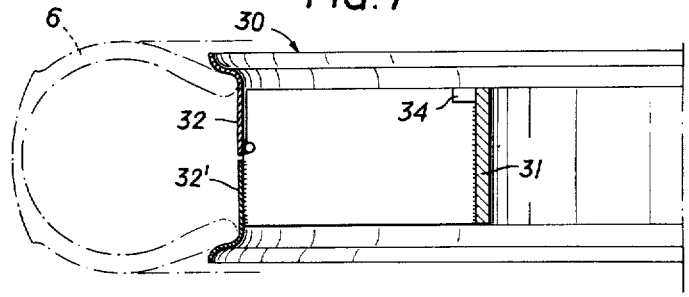

PROCESS FOR RETREADING A VEHICLE TYRE

This is a division of application Ser. No. 52,861, filed July 7, 1970, now U.S. Pat. No. 3,738,893.

The invention concerns a process for retreading a vehicle tyre.

It is known in connection with retreading worn vehicle tyres to apply a tread band to the tyre and to bond it to the tyre. For this purpose, the vehicle tyre, in order to remove unevennesses, is first buffed and subsequently abraded in order to ensure good adhesion with the tread band. Thereafter, a tread band is coated with unvulcanised rubber and is applied manually to the vehicle tyre. The tyre and the tread band are then completely enveloped in a jacket and the jacket is evacuated. The result of this is that the external atmospheric pressure acts on the tread band to press it against the tyre. Finally, in order to achieve a firm bond between the tread band and the tyre, the tyre, still enveloped in the jacket, is subjected to a heat treatment to vulcanise the rubber between tread band and tyre.

This process displays a number of disadvantages. Firstly, this process may only be partially mechanised, because the tyre, which is not mounted on a rim, does not maintain its shape. In addition, when the tyres are large, e.g. lorry tyres, auxiliary apparatus is required, such apparatus not being required for smaller tyres.

Secondly, as the process does not require the tyre to be inflated, the tyre does not display the same size during retreading as it does when it is used. Thus, inflation of the tyre after retreading may lead to the formation of cracks in the tread band.

A further disadvantage with this process is that it is not possible to avoid trapping air between the tread band and the tyre during application of the tread band to the tyre and that any air trapped cannot be reliably removed by merely evacuating the jacket enveloping the tyre. Where air is trapped between the tread band and the tyre, an incomplete bond is formed therebetween during vulcanisation. A retreaded tyre displaying such defects must, therefore, be regarded as a reject, because the tread band may easily, in use, become detached from the tyre.

Finally, an additional disadvantage of this process is that applying the tread band to the tyre manually cannot be performed accurately enough for the lateral edges of the tread band to be precisely aligned with the sidewalls of the tyre.

In summary, it may therefore be concluded that this known process, on the one hand, requires manual labour and the associated expense of such labour and that, on the other hand, it does not ensure a conmpletely satisfactory bond between the tyre and the tread band.

Although the present invention is primarily directed to any novel integer or step, or combination of integers or steps, hereinbefore described and/or shown in the accompanying drawings, nevertheless according to one particular aspect of the present inveniton to which, however, the invention is in no way restricted, there is provided a process for retreading a vehicle tyre comprising the steps of disposing a closed tread band around and spaced from a tyre to be retreaded, evacuating the space between the tread band and the tyre, bringing the tread band into contact with the tyre, and affixing the tread band to the tyre.

Preferably the process includes stretching the tread band to be spaced from the tyre. The process may also include the step of inflating the tyre prior to bringing the tread band into contact with the tyre.

Preferably, the affixing of the tread band to the tyre is by vulcanisation of an unvulcanised rubber layer provided between the tyre and the tread band. The process may, in addition, include the step of abrading the tyre prior to bringing the tread band into contact with the tyre.

The tread band is, preferably, more difficult to stretch over its edge region than over its central region. Thus, continuous strips may be provided along the longitudinal edges of the tread band, the central region of the tread band being weakened by providing it with grooves or channels.

According to a further non-restrictive aspect of the present invention, there is provided an apparatus for positioning the tread band on a vehicle tyre, comprising a vessel, gripping means within the vessel for disposing a closed tread band around and spaced apart from a tyre to be retreaded, and for bringing the tread band into contact with the tyre, evacuating means for evacuating the vessel and the space between the tread band and the tyre, and means for affixing the tread band to the tyre.

The gripping means may be radially displaceable relative to the tyre axis.

The vessel may have a lid, and sealing means may be provided to hermetically seal the lid on the vessel. Hydraulic means may also be provided to move the lid relative to the vessel.

In the preferred embodiment the sealing means comprises a hose extending around and adjacent the junction between the vessel and the lid when the latter is in position on the vessel, and means to inflate the hose to hermetically seal the vessel. The lid of the vessel, therefore, may have a groove within which the hose is disposed.

The apparatus, preferably, includes crane means for moving the tread band into the vessel and for moving the tyre into and out of the vessel. The crane means may be pivotally mounted relative to the vessel, and may be provided with gripping means for engaging the tread band and the tyre and moving the same.

A mandrel may be provided in the vessel for carrying the tyre. A sleeve, preferably, is rotatably mounted on the mandrel so that the rim and tyre may be rotated relative to the mandrel.

The apparatus may also include a rim for carrying a tyre to be retreaded, the rim comprising two parts retained together by a connecting means, the arrangement being such that the rim can be split in the plane of the tyre.

In addition, the apparatus may include a roll which may be driven and which may be moved from a position where it is spaced apart from the tyre to a position in which it engages the tyre to rotate the same.

The gripping means may be hydraulically movable. In the preferred embodiment, the gripping means comprises a plurality of grippers, each gripper being carried by a respective cylinder of a piston and cylinder arrangement, each cylinder being displaceable relative to the piston by a pressure fluid supplied to the cylinder. Each piston may be carried by a rod, through which, in operation, pressure fluid is supplied to the respective cylinder. Preferably, the grippers include at least one pair of mutually facing, displaceable hooks. Thus, the hooks of the or each pair may be connected together by linkage means. The hooks of the or each pair are, preferably, displaceable by a pressure medium.

Figure 2:
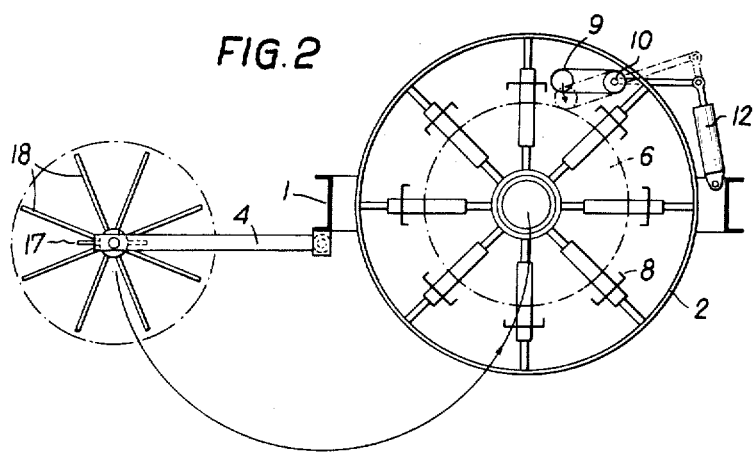
Figure 9:
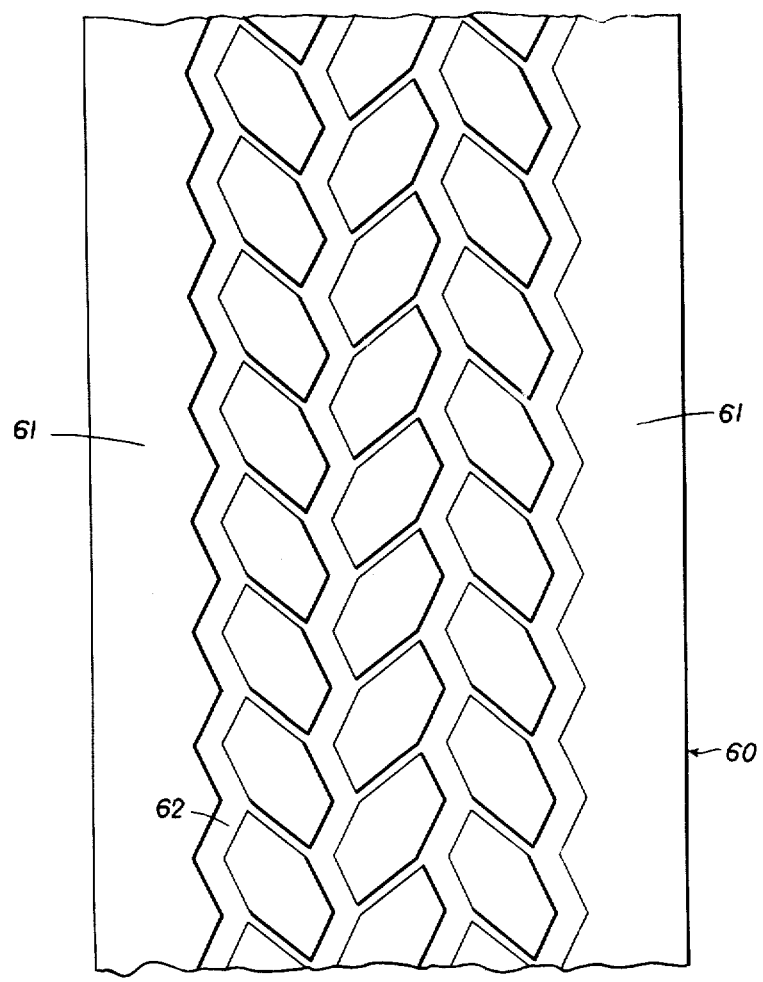

The invention is illustrated, merely by way of example, in the accompanying drawings, in which:

FIG. 1 is a side view, in section, of an apparatus according to the present invention, FIG. 2 is a plan view of the apparatus of FIG. 1, FIGS. 3a–3d are diagrammatic representations illustrating the application of a tread band on a vehicle tyre, FIG. 4 shows a part of the apparatus of FIG. 1 on a larger scale, FIG. 5 shows a side view of part of FIG. 4, FIG. 6 is a section taken on line VI—VI of FIG. 5, FIGS. 7 and 8 show, in plan and partially in section, parts of a rim for holding a vehicle tyre, and FIG. 9 is the plan view of a tread band for use with the present invention.

An apparatus according to the present invention is shown in FIGS. 1 and 2. This apparatus consists of a framework 1 carrying a cylindrical vessel 2 that can be hermetically sealed by a lid 3. The frame is provided, on one side, with a pivotally movable crane arm 4 which is vertically displaceable along, and pivotally mounted about, an axis 5 and which can be pivoted to a position over the vessel 2.

In the vessel 2 there is a mandrel 7 for accommodating a rim (not shown) carrying a vehicle tyre 6 to be retreaded. In FIG. 1, the tyre 6 is shown being carried by the crane arm 4. In addition, a plurality of grippers 8, displaceable radially with respect to the mandrel 7, are arranged in the vessel 2. These grippers are described in greater detail with reference to FIGS. 4 to 6. The vessel 2 also has a roll 9 (FIG. 2) disposed therein, and this roll can be driven and pivoted into contact with the vehicle tyre 6 when carried by the mandrel 7. A cylinder 12, provided outside the vessel 2, pivots the roll 9 about an axis 10.

The lid 3 of the vessel 2 is vertically displaceable by a cylinder 14 carried by the framework 1. When the lid 3 is in the position shown in FIG. 1 the crane arm 4 can be pivoted and a vehicle tyre to be retreaded, and a tread band can be introduced into the vessel. When the lid 3 is lowered on to the vessel 2, the latter is hermetically sealed and a reduced pressure or vacuum is generated in the vessel.

The crane arm 4 is provided at its outer end with a carrier 17 for a vehicle tyre 6 and with grippers 18 for a tread band. The carrier 17 and the grippers 18 are carried by a cylinder 21 whose piston 20 is connected to the crane arm, thereby allowing the carrier 17 and grippers 18 to be vertically adjustable. Pressure medium is fed to the cylinder 21 via flexible lines (not shown).

FIG. 4 shows, in greater detail, the construction of the mandrel 7, the grippers 8 and means for hermetically sealing the vessel 2. The mandrel 7 comprises a sleeve 25 centrally mounted in the vessel 2 carrying a bearing sleeve 26 that can be rotated with respect to the sleeve 25. The bearing sleeve 26 accommodates a rim 30 carrying the tyre 6.

In order to ensure that the vessel 2 is hermetically sealed, the edge of the lid 3 has an L-section 64 forming a groove. A hose 65 is inserted in the groove, and the hose can be inflated and deflated via a line 66. As soon as hose 65 is inflated it lies sealingly against both the wall of the vessel 2 and the lid 3.

A plurality (eight shown in FIG. 2) of piston rods 35, arranged in the shape of a star, are provided adjacent to the base of vessel 2, and each of these piston rods has a piston 36 approximately at its centre between the wall of the vessel 2 and the mandrel 7. Each rod has a bore 38 extending from the wall of the vessel 2 to the piston 36 and a bore 38' extending from the piston to a distributor 37. Each piston rod 35 and piston 36 is surrounded by a cylinder 39 whose head portions 45, 45' can slide over the base of the vessel 2.

When a pressure medium is introduced through the bore 38 of the piston rod 35, it enters a left-hand cylinder space 41 through a radial bore 40 and effects a radially outward displacement of the cylinders 39 and the grippers 8 carried thereby towards the wall of the vessel 2. The pressure medium in an inner cylinder space 42 reaches the distributor 37 through a radial bore 43 and the bore 38'. By contrast, when pressure medium is supplied from distributor 37 it effects a radially inward displacement of the cylinders 39 and grippers 8 towards the distributor 37.

As is shown in FIGS. 4 to 6, each gripper 8 comprises a carrier 46 connected to the head portion 45 of the respective cylinder 39. This carrier 46 carries two pairs of hooks 47, 47' and 48, 48' to grip the tread band. The hooks are connected with one another by means of a plurality of linkage rods 51, 52, 53 and can be moved vertically by means of a cylinder 50 whose piston rod 57 engages on a carrier 55 carrying the hooks 47, 48.

FIGS. 7 and 8 show a rim 30 for use with the previously described apparatus. In order to be able to fit the tyre 6 on the rim 30 simply, the rim is capable of being split into two parts in a plane perpendicular to the axis of the tyre, i.e. in the plane of the tyre. The two rim parts are connected with each other in a manner similar to that of a bayonet closure. The rim consists of an inner sleeve 31 which is adapted to lie on the bearing sleeve 26 and outer rim portions 32, 32' carrying tyre. The inner sleeve 31 and the rim portion 32' are connected with one another by radial webs 33 arranged in the form of a star. In order to enable the carrier 17 on the crane arm 4 to engage and retain the rim 30 and the tyre 6, the inner sleeve 31 is provided with horizontally projecting extensions 34 beneath which the carrier 17, having likewise horizontally projecting portions (not shown), is arranged so as to engage and retain the rim 30 and the tyre 6 on the crane arm 4.

FIG. 9 shows a tread band that is suitable for retreading a tyre. A rubber tread strip when pressed into a band forms a band of cylindrical shape. However, the surface of the tread zone of a tyre is cambered, and thus the tread band should likewise be able to assume a cambered shape in order to avoid interfering stresses arising in it during its application to the tyre and during vulcanisation. A tread band 60 is shown in FIG. 9 and this is provided along its longitudinal edges with continuous strips 61, while over its central region it is weakened by grooves or channels 62. This construction ensures that the tread band can stretch over its central region to a greater extent than over its edge region and as a result assumes the desired cambered shape of the tyre as soon as it is applied thereto.

Retreading of a vehicle tyre using the apparatus hereinbefore described takes place in the following manner. A vehicle tyre 6 to be retreaded is buffed to eliminate unevenness and is then abraded. Next, a tread band 60 is cut into the length required for the tyre and formed into a ring. The tread band is provided with a coating of non-vulcanised rubber. The tyre is fitted to the rim 30 by placing it between the outer rim portion 32, 32', and joining these outer rim portions together by the bayonet closure. The tyre is then inflated, to its normal pressure, and preferably to an excess pressure.

Figure 3A:
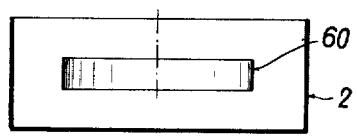
Figure 3C:
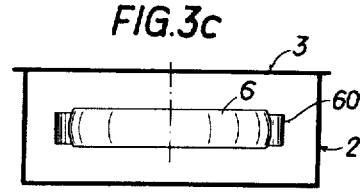
Figure 3B:
Figure 3D:
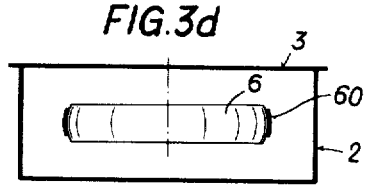

Initially, the tread band 60 is engaged and retained by the grippers 18 of the crane arm 4, the latter being pivoted so that the tread band is introduced into vessel 2. Once in the vessel the tread band is engaged and retained by the grippers 8 (as shown schematically in FIG. 3a). As soon as the pairs of hooks 47, 47', 48, 48', have engaged the tread band 60, pressure fluid is fed to the bore 38 of each piston rod 35, causing the grippers 8 to move radially outwardly. As a result tread band 60, as shown schematically in FIG. 3b, is stretched to a larger diameter. The tyre to be retreaded is then introduced into the vessel 2 by means of the crane arm 4 whose carrier 17 engages beneath the extensions 34 in the rim 30. The rim is then laid on the bearing sleeve 26. Subsequently, the lid 3 is lowered on to vessel 2 by the cylinder 14, and by inflating the hose 65 the vessel 2 is hermetically sealed. FIG. 3c shows schematically the positions of the tyre 6 and the tread band at this stage.

The next step is to reduce the pressure in the vessel 2 and this is accomplished by means not shown. Pressure fluid is fed to the distributor 37, and channels 38' to cause the grippers 8 to be displaced radially inwardly and the tread band engages the tyre 6. Finally, by actuating the cylinder 50 the pairs of hooks 47, 47', 48, 48' are moved apart vertically so that they no longer engage the tread band. As a result the tread band 60 is engaged on the tyre, as is shown schematically in FIG. 3d.

The grippers 8 are then moved radially outwardly and the cylinder 12 is actuated so that the roll 9 engages the tread band 60 and causes the tyre to rotate together with the rim 30 and the bearing sleeve 26. The pressure exerted on tread band 60 by the roll 9 causes the tread band to be pressed evenly on the tyre 6.

As soon as this has taken place, the hose 65 is deflated and air is admitted into vessel 2, and the lid 3 is raised. The tyre 6, with the tread band 60 now applied on it, is taken out of vessel 2 by means of the crane arm 4. The tyre and rim 30 are then introduced into an autoclave (not shown) to vulcanise the rubber layer provided between tread band 60 and tyre 6. The tyre pressure is controlled from outside the autoclave during vulcanisation.

It will be apparent that this process avoids the disadvantages of the previously known process. On the one hand, the process according to the present invention achieves substantial mechanisation resulting in an elimination of expensive manual labour. On the other hand, the fact that the tread band is applied on the tyre inside an evacuated vessel absolutely eliminates trapping of air between the tread band and the tyre. Finally, the tread band is accurately applied to the tyre because the tyre is held in the desired position with respect to the tread band.

The embodiments of the invention in which an exclusive property or privilege is claimed are defined as follows:

1. A process for retreading a vehicle tyre comprising the steps of:
   a. positioning a closed tread band and a tyre to be retreaded within a vessel with the tread band loosely surrounding the tyre and spaced out of contact with the tyre by an intervening open space;
   b. sealing the vessel;
   c. maintaining said tread band and tyre spaced apart while reducing the pressure in the interior of the vessel, including said space between said tread band and tyre;
   d. thereafter moving said tread band and tyre into contact and eliminating said space therebetween while maintaining said reduced pressure; and
   e. affixing together the contacting tread band and tyre.

2. A process according to claim 1, including stretching the tread band to space same from the tyre by said open space.

3. A process according to claim 1, including the step of inflating the tyre prior to bringing the tread band into contact with the tyre.

4. A process according to claim 1, in which the affixing of the tread band to the tyre is by vulcanisation of an unvulcanised rubber layer included on at least one of the opposed faces of the tyre and the tread band.

5. A process according to claim 1, including the step of abrading the tyre prior to bringing the tread band into contact with the tyre.

6. A process according to claim 2, in which the tread band is more difficult to stretch over its edge region than over its central region.

7. A process according to claim 6, in which continuous strips are provided along the longitudinal edges of the tread band, the central region of the tread band being weakened by providing it with grooves or channels.

8. A process according to claim 1 in which said positioning step includes locating the tyre on a mandrel inside said vessel and supporting said tread band on grippers located within said vessel, said moving step including shifting said grippers radially within the sealed vessel toward said mandrel for engaging said tread band with said tyre.

9. A process according to claim 1 in which said positioning step includes loosely locating the tread band and tyre in the interior of a rigid vessel by insertion through a fixed opening therein and said step of sealing includes applying a cover to the open wall of said vessel and energizing a sealing member into sealing relation with said cover and adjacent walls of said vessel.

10. A process according to claim 1 including the preliminary steps of buffing and abrading the tyre, fitting the tyre onto a rim and inflating said tyre, forming the tread band into a ring, applying a coating of non-vulcanized rubber to one of said tread band and tyre, whereafter said positioning step is carried out, said positioning step including placement of the rim on a mandrel within said vessel and placement of the tread band on grippers inside said vessel and so located as to provide said intervening open space between the opposed surfaces of said tread band and tyre, said coating being incorporated in at least one of said surfaces.

11. A process according to claim 1 including the preliminary step of coating at least one of the opposed surfaces of the tread band and tyre with a substance bondable to the opposed surface of the other of said tread band and tyre and wherein said open space is between the entirety of said coating and of said opposed surface.

12. A process according to claim 1 in which said affixing step includes bearing a roll member, within the vessel, on the exterior of the tread band and therewith pressing the tread band evenly against said tyre while rotating the tyre and tread band together within the vessel and while maintaining said reduced pressure therewithin.

13. A process according to claim 12 in which said affixing step further includes admitting air into the vessel, removing a cover from the vessel, removing the tyre, with the tread thereon, from the vessel and vulcanizing a rubber layer defining the inner surface of one of said tyre and tread band.

14. A process according to claim 13 including the preliminary step of mounting the tyre on a rim and inflating said tyre to a desired pressure prior to said positioning step and maintaining said tyre under pressure thereafter through said vulcanizing step.

* * * * *